W. REINHARDT.
PROCESS OF TREATING MALT.
APPLICATION FILED JUNE 30, 1910.
989,421.
Patented Apr. 11, 1911.
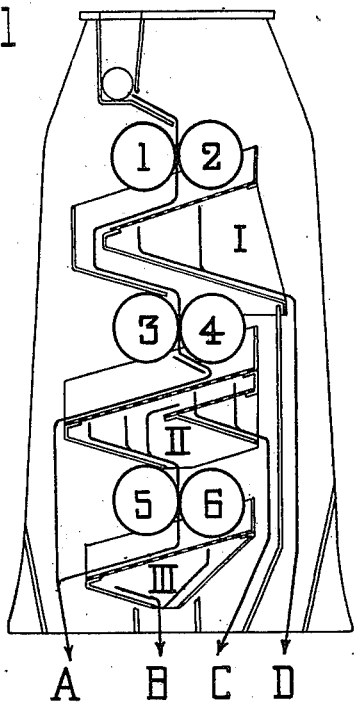
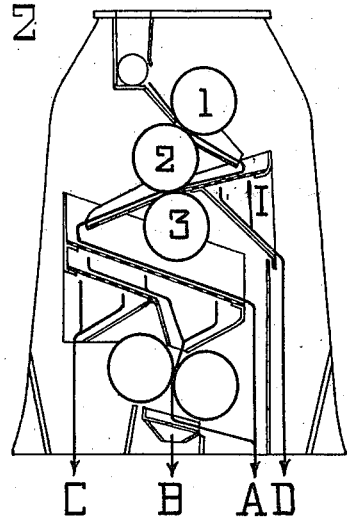

UNITED STATES PATENT OFFICE.

WALTER REINHARDT, OF FRANKFORT-ON-THE-MAIN, GERMANY.

PROCESS OF TREATING MALT.

989,421.  Specification of Letters Patent.  Patented Apr. 11, 1911.

Application filed June 30, 1910.  Serial No. 569,677.

*To all whom it may concern:*

Be it known that I, WALTER REINHARDT, engineer, citizen of the German Empire, residing at 5 Flörsheimerstrasse, Frankfort-on-the-Main, Germany, have invented new and useful Improvements in Processes of Treating Malt, of which the following is a specificaton.

My invention relates to a process of crushing malt and separating the meal body from the hulls and also dividing such meal body into separate parts distinguished by separate chemical characteristics.

Malt is the grain of barley or other cereal, steeped in water, permitted to germinate and then dried in a kiln. The malted grain is composed of hull, meal body, and sprouts, but the sprouts are removed by suitable cleaning mechanism after the drying operation is completed. The meal body is composed of a readily pulverizable portion and of a vitreous portion, the latter extending inwardly from one or both of the ends and known in the trade as "steely" or "glassy" points. The steely points contain carbohydrates and albuminoids in a highly insoluble form and are therefore not suitable for brewing purposes unless they are thoroughly comminuted and submitted to a longer mashing process than is suitable for the remainder of the meal body. The readily pulverizable portion of the meal-body may be termed the flour-body and this flour-body is composed of a portion lying near the center of the grain and another portion surrounding said first-named portion. The former may be designated as the primary flour-body, and this is composed of very highly soluble carbohydrates and albuminoids; and to the latter may be applied the term secondary flour-body and this is composed of carbohydrates and albuminoids much less soluble than those of the primary flour body, but infinitely more soluble than those of the steely points. It is of importance in some mashing processes that the hulls be kept as nearly intact as possible. The hulls are mixed with the meal-body during the mashing process, and after this process is completed the whole mass settles upon the perforated false bottom of the mash tub. The wort filters through the mash and through the false bottom into the beer kettle. If the hulls are much broken up, the mash will be clogged and the filtering takes an inordinately long time.

By crushing the malt in one operation, as is the present practice, the steely points are not crushed as the rollers can not be set closely enough to do so without destroying the hulls. As a consequence the steely points are left substantially intact and, because of their high degree of insolubilty, are not dissolved during the mashing process, but remain as unconverted starch and are thrown out with the residue, thus becoming lost to the brewing process.

One object of this invention is to separate the flour-body from the steely points.

Another object of this invention is to separate the steely points from the hulls with as little injury to the hulls as possible.

A further object of this invention is to crush and obtain separately the primary and secondary flour bodies and also to obtain such flour-bodies separately from the steely points so that they may be separately mashed.

In the accompanying drawings wherein are shown two forms of apparatus for carrying out my process: Figure 1 is a diagram showing a mill having three pairs of rollers; Fig. 2 is a similar view in which three rollers take the place of the first two pairs shown in Fig. 1.

Referring to Fig. 1, the malt is fed into the mill in any usual manner and passes between the first pair of rollers 1 and 2, at which time it is slightly crushed, the rollers being set sufficiently near together to crack the hulls and to crush the flour-body and to loosen the primary flour-body without, however, crushing the steely points to any substantial degree. Thus the inner or primary flour-body is crushed and freed, and passes, in the form of a coarse flour, through the meshes of the oscillating sieve beneath the rollers and, following the course of the arrow, passes out at D into any suitable receptacle. The remainder of the malt travels over the sieve and is fed to and passes between the second pair of rollers 3 and 4, which is preferably more closely set than rollers 1 and 2 so as to crush and flatten the steely points and to separate out the secondary flour-body which normally adheres to the hulls. The secondary flour-body then passes through the oscillating sieve below the rollers 3 and 4 in the form of a coarse flour and, following the course of the arrow, passes out at C into any suitable receptacle. If the malt is very brittle, separation of the main portion of the hulls from those portions which surround the steely points has already been accomplished by rollers 3 and 4; if the malt is less brittle the agitation of the grains upon the sieve brings about such separation or even a separation of the entire hull portion from the steely points. This is made possible by the fact that the primary flour has already been removed, thus permitting closer setting of the rollers and also an easier transverse cracking or easier peeling off of the hulls. The hulls which have been freed of the secondary flour and of the steely points travel over the sieve and, following the course of the arrow, pass out at A. The steely points which pass through the first of the sieves, but not to the second, are fed to and pass between the third pair of rollers 5 and 6, at which point they are ground and, passing through the sieve below the rollers 5 and 6, follow the course of the arrow and pass out at B, where they may be collected in any suitable receptacle. Any hulls, or portions of hulls which have adhered to the steely points, will travel over the sieve and pass out at A. By means of this improved process the various portions of the malt are separated in accordance with their chemical characteristics, and, furthermore, the steely points are ground, thus rendering them more adaptable for use in the mashing process, while the main portions of the hull-bodies are not reduced to a size which makes them unsuitable for use in the mashing process.

In Fig. 2 the general operation is the same, being preferably as follows: The malt first passes between the rollers 1 and 2 on to the oscillating sieve, the primary flour body being liberated as above described and passing out at D. The remaining portion of the malt passes through rollers 2 and 3 to the secondary flour-body, and the steely points being freed from the hulls, the material is deposited upon the sieve between the rollers 2 and 3, the hulls passing along the sieve and, following the course of the arrow, leaving at A. The secondary flour-body passes through the sieve in the form of a coarse flour and, following the course of the arrow, passes out at C, while the steely points are ground between the lower set of rollers and pass out at B. Any hulls which may have adhered to the steely points pass along the top of the sieve immediately below the third set of rollers and pass out at A.

When I speak in the claims of separating the steely points from the hulls I intend to have this expression construed so as to include an actual separation of so much of hull as is attached to the steely point, or a separation of the free portion of the hull from so much of the hull as immediately surrounds the steely point. The actual separation may take place in one way or the other without substantially affecting my invention, as any portion of the hull which sticks to the steely point is separated by the grinding bar rollers 5 and 6, and runs off at A, the grinding operation not being sufficient to grind the hull portions.

Various modifications may be made in the carrying out of this process without departing from the spirit of my invention as specified in the appended claims.

I claim:

1. The process of treating malt which consists in crushing the malt sufficiently to crush the primary flour body while leaving the steely points substantially intact, removing the primary flour body, again crushing the malt, removing the secondary flour body, then freeing the steely points from the hulls by agitation, removing the hulls, and grinding the steely points, substantially as described.

2. The process of treating malt which consists in crushing the malt sufficiently to crush the primary flour body while leaving the steely points substantially intact, removing the primary flour body, again crushing the malt, removing the secondary flour body, then freeing the steely points from the hulls by agitation, substantially as described.

3. The process of treating malt which consists in crushing the malt sufficiently to crush the primary flour body while leaving the steely points substantially intact, removing the primary flour body, again crushing the malt, removing the secondary flour body, then freeing the steely points from the hulls, substantially as described.

4. The process of treating malt which consists in crushing the malt sufficiently to crush the flour body while leaving the steely points substantially intact, removing the flour body, freeing the steely points from the hulls by agitating the same, removing the hulls and grinding the steely points, substantially as described.

In testimony whereof I have signed my name to this specification in the presence of two subscribing witnesses.

WALTER REINHARDT.

Witnesses:
ERNST RAUER,
KARL MAXANE.